(12) United States Patent
Watanabe et al.

(10) Patent No.: US 8,785,033 B2
(45) Date of Patent: Jul. 22, 2014

(54) ASSEMBLED BATTERY

(75) Inventors: Kyoichi Watanabe, Kanagawa-ken (JP); Hideaki Horie, Kanagawa-ken (JP); Hiroshi Sugawara, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 645 days.

(21) Appl. No.: 10/234,318

(22) Filed: Sep. 5, 2002

(65) Prior Publication Data

US 2003/0054239 A1 Mar. 20, 2003

(30) Foreign Application Priority Data

Sep. 17, 2001 (JP) ................ P 2001-281217

(51) Int. Cl.
*H01M 6/42* (2006.01)
(52) U.S. Cl.
USPC ................ 429/149; 429/153; 429/162
(58) Field of Classification Search
USPC ......... 429/149, 152, 153, 159, 173, 184, 185, 429/162
See application file for complete search history.

(56) References Cited

U.S. PATENT DOCUMENTS

| | | | |
|---|---|---|---|
| 3,531,327 A | | 9/1970 | Moos |
| 3,553,020 A | * | 1/1971 | Corbin et al. .................. 429/84 |
| 3,844,841 A | * | 10/1974 | Baker ............................ 429/90 |
| 5,422,200 A | * | 6/1995 | Hope et al. .................... 429/157 |
| 6,316,140 B1 | * | 11/2001 | Hatazawa et al. ............. 429/163 |
| 6,664,006 B1 | * | 12/2003 | Munshi ......................... 429/305 |

FOREIGN PATENT DOCUMENTS

| | | | |
|---|---|---|---|
| JP | 56024756 A | | 3/1981 |
| JP | 59180984 A | | 10/1984 |
| JP | 11-273643 | | 10/1999 |
| JP | 2001254003 A | * | 9/2001 |
| WO | WO 01/67529 A1 | | 9/2001 |

OTHER PUBLICATIONS

Data sheet for ISODAMP C-8002 Thermoplastic Elastomer Molding Material [online]. Aearo Company, 2005 [retrieved on Mar. 21, 2005]. Retrieved from the Internet: <URL: http://www.earsc.com/pdfs/engineering/literature/Brochures/C8002Brochure.pdf>.*
Definition of "embed," Webster's II New Riverside University Dictionary, Houghton Boston: Mifflin Company, 1984, p. 426.*

* cited by examiner

*Primary Examiner* — Jane Rhee
(74) *Attorney, Agent, or Firm* — McDermott Will & Emery LLP (57) ABSTRACT

In an assembled battery including at least two unit cells provided within a supporter, each unit cell is a thin laminate cell packaged with a laminate, and each unit cell is covered by at least one resin. Thus, the assembled battery has a stable performance without structure breakdown or a fracture of the connection tab even when vibration is applied.

8 Claims, 8 Drawing Sheets

| | THE NUMBER OF UNIT CELLS | RESIN GROUP | DYNAMIC SPRING CONSTANT RATIO (%) | VOLUME RATIO (%) | CELL THICKNESS (mm) | NOTE | ACCELERATION RATIO | | | AVERAGE REDUCTION RATIO |
|---|---|---|---|---|---|---|---|---|---|---|
| | | | | | | | 10Hz | 50Hz | 100Hz | 10-300Hz |
| EXAMPLE 1 | 2 | RESIN 21 | 60 | 100 | 5 | SHAPE 1 | 0.26 | 0.29 | 0.35 | 71% |
| EXAMPLE 2 | 2 | RESIN 27 | 80 | 100 | 5 | SHAPE 1 | 0.43 | 0.48 | 0.58 | 52% |
| EXAMPLE 3 | 2 | RESIN 29 | 70 | 100 | 5 | SHAPE 1 | 0.37 | 0.41 | 0.50 | 59% |
| EXAMPLE 4 | 2 | RESIN 25 | 95 | 100 | 5 | SHAPE 1 | 0.94 | 0.90 | 0.94 | 7% |
| EXAMPLE 5 | 2 | RESIN 23 | 80 | 100 | 5 | SHAPE 1 | 0.74 | 0.82 | 0.99 | 19% |
| EXAMPLE 6 | 2 | RESIN 31 | 85 | 100 | 5 | SHAPE 1 | 0.89 | 0.85 | 0.96 | 11% |
| EXAMPLE 7 | 2 | RESIN 21 | 60 | 95 | 5 | SHAPE 1 | 0.25 | 0.28 | 0.33 | 72% |
| EXAMPLE 8 | 24 | RESIN 21 | 60 | 100 | 5 | SHAPE 1 | 0.39 | 0.44 | 0.53 | 57% |
| EXAMPLE 9 | 24 | RESIN 21 | 60 | 100 | 5 | SHAPE 2 | 0.52 | 0.58 | 0.70 | 43% |
| EXAMPLE 10 | 2 | RESIN 21/23/21 | 60/80/60 | 100 | 5 | SHAPE 1 | 0.49 | 0.45 | 0.42 | 54% |
| EXAMPLE 11 | 4 | RESIN 21/23/25/23/21 | 60/80/95/80/60 | 100 | 5 | SHAPE 1 | 0.71 | 0.64 | 0.59 | 33% |
| COMPARATIVE EXAMPLE 1 | 4 | NONE | | 0 | 5 | SHAPE 1 | 1.0 | 1.0 | 1.0 | 0% |

FIG.14

| | RESIN 21 (URETHANE) | RESIN 27 (URETHANE) | RESIN 29 (URETHANE) | RESIN 25 (EPOXY) | RESIN 23 (OLEFIN) | RESIN 31 (NYLON) | COMPARATIVE RESIN A (URETHANE) | COMPARATIVE RESIN B (OLEFIN) | COMPARATIVE RESIN C (OLEFIN) | COMPARATIVE RESIN D (URETHANE) |
|---|---|---|---|---|---|---|---|---|---|---|
| SPECIFIC GRAVITY | 0.98 | 1.03 | 1.01 | 1.2 | 1 | 1.2 | 1 | 1 | 1 | 1 |
| HARDNESS (JISA) | 21 | 35 | 30 | 90 | 60 | 85 | 5 | 100 | 90 | 10 |
| DIELECTRIC LOSS TANGENT (kHz) | 0.038 | 0.07 | 0.08 | 0.005 | 0.005 | 0.005 | 0.02 | 0.004 | 0.0005 | 0.51 |
| GLASS TRANSITION TEMPERATURE (°C) | -57 | -35 | -40 | 110 | ABOUT 100 | ABOUT 100 | — | — | — | — |
| COEFFICIENT LINEAR EXPANSION (1/°C) | 2.2×10⁻⁴ | 2.0×10⁻⁴ | 1.0×10⁻⁴ | 5.0×10⁻⁵ | 1.0×10⁻⁴ | 1.0×10⁻⁴ | — | — | — | — |
| VOLUME RESISTIVITY (Ω·cm) | 1×10¹³ | 6×10¹⁴ | 16×10¹⁴ | 4×10¹⁶ | 1×10¹⁵ | 1×10¹⁴ | — | — | — | — |
| DIELECTRIC BREAKDOWN STRENGTH (kV/mm) | 23 | 18 | 23 | 25 | 20 | 20 | — | — | — | — |
| NOTE | TWO LIQUID MIXED, SOLIDIFIED AT ROOM TEMPERATURE | TWO LIQUID MIXED, SOLIDIFIED AT ROOM TEMPERATURE | TWO LIQUID MIXED, SOLIDIFIED AT ROOM TEMPERATURE | TWO LIQUID MIXED, SOLIDIFIED AT ROOM TEMPERATURE | TWO LIQUID MIXED, SOLIDIFIED AT ROOM TEMPERATURE | TWO LIQUID MIXED, SOLIDIFIED AT ROOM TEMPERATURE | — | — | — | — |

ASSEMBLED BATTERY

BACKGROUND OF THE INVENTION

1. Field of the Invention

The present invention relates to an assembled battery constituted by combining a plurality of secondary battery single cells, and specifically, to an assembled battery which is constituted by combining small-scale secondary cells, and can be publicly used as a battery for driving the motor of an electric vehicle or the like.

2. Description of the Related Art

In recent years, control of carbon dioxide emissions has been sought against a background of a growing environmental protection movement. In such circumstances, in order to promote the introduction of an electric vehicle (EV), a hybrid electric vehicle (HEV), and a fuel cell vehicle (FCV) in place of a vehicle using fossil fuels such as gasoline-powered vehicle, automobile companies have been developing the battery for the driving motor, which has a key for practical application thereof. In such an application, a rechargeable secondary battery is used. In applications requiring high output and high energy density, such as the motor drive battery of the EV, the HEV, or the FCV, in practice, a single large-scaled battery cannot be manufactured. Therefore, an assembled battery constituted by connecting a plurality of cells in series has been generally used.

However, in such a method, the capacity of each cell needs to be made very large, and a specialized production line needs to be provided for production. Particularly, in the assembled battery for the EV or the like requiring a large capacity, each cell is very heavy, so that the cells are difficult to handle.

It is conceived that a number of small-scaled cells, which are easy to handle (hereinafter-, referred to as a unit cell) are connected to be used in applications of the EV, the HEV, and the FCV. Alternatively, it is conceived when a lithium ion secondary battery of high output and high energy density is used as an assembled battery for vehicles for charge and discharge, an assembled battery, in which each group having a plurality of unit cells connected in parallel are connected in series, is used. Thus, an assembled battery obtains a voltage of 400 V as a whole. In order to make a 12 V or a 42 V battery for vehicles to have higher performance, a more compact size, and lower costs, utilization of a consumer lithium ion battery becomes favorable. As the unit cell constituting the assembled battery for vehicles requiring a high voltage, a bipolar lithium secondary battery is also favorable. A bipolar lithium secondary battery comprises a plurality of bipolar electrodes which each have a positive electrode formed on one surface of a collector and a negative electrode formed on the other surface, and a plurality of bipolar electrodes are layered in series with a solid polymer electrolyte interposed therebetween.

The assembled battery for the electric vehicle is always used in a state where vibration is applied thereto. Therefore, vibration resistance is required such that there occurs no defect of a structural breakdown such as a fracture of a collector and a fracture of a collector weld portion, a fracture of a connection tab for electrically connecting the unit cells, or the like.

As a conventional technology of the assembled battery having a plurality of unit cells connected with each other as described above, there is a technology described in Japanese Patent Application Laid-Open No. 11-273643.

SUMMARY OF THE INVENTION

However, in the assembled battery of the conventional art, a can has rubber buffer members provided only at the connection portions on both sides thereof. There is only air interposed between the can and a supporter. Therefore, when vibration is applied to the assembled battery, an amplitude at the center of the can, or amplitudes at ¼ and ¾ wavelength positions become large at a first nature frequency, a second nature frequency, or the like in the length direction of the can. Accordingly, there is a concern that fatigue occurs in the cylindrical side surface of the can. Furthermore, stress thereof is directly applied to the buffer members on both sides of the can, so that there is a concern that the endurance of the buffer members is lowered.

In a unit cell having both a cathode and an anode positioned on an upper or a lower surface thereof, the unit cell needs to be supported only on a side having both electrodes positioned, so that it is more difficult to ensure durability to the application of vibration.

It is assumed that a space between the can and the supporter is filled with a buffer member or the like. When a unit cell, as in the conventional art, which requires maintenance is covered with the buffer member or the like, ease of detachment is impaired. Furthermore, heat remains within the can, thus causing deterioration of the endurance of the battery itself.

The present invention has been made in consideration of the above problems. The object thereof is to provide an assembled battery having a plurality of cells combined, which is capable of presenting a stable performance without structural breakdown or a fracture of the connection tab even when vibration is applied.

The first aspect of the present invention provides an assembled battery, comprising: a supporter; a plurality of unit cells provided within the supporter; and a resin group formed by one or more resins and covering the unit cells, wherein the unit cell is thin layer laminated cell packaged with a laminate.

BRIEF DESCRIPTION OF THE DRAWINGS

The invention will now be described with reference to the accompanying drawings wherein.

DETAILED DESCRIPTION OF THE PREFERRED EMBODIMENTS

Hereinafter, description will be made of embodiments of the present invention with reference to the drawings.

Embodiment 1

Figure 1A:
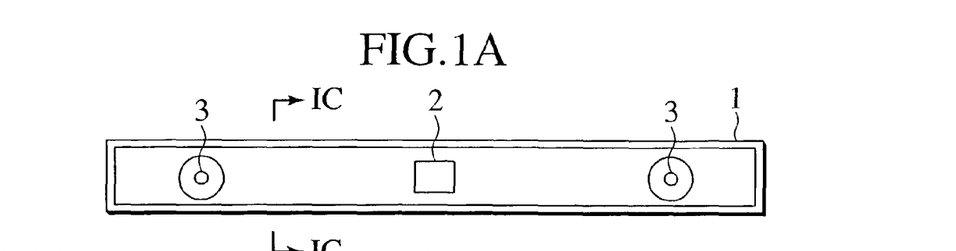
FIG. 1A is a top view of an assembled battery structure of embodiment 1.
Figure 1B:
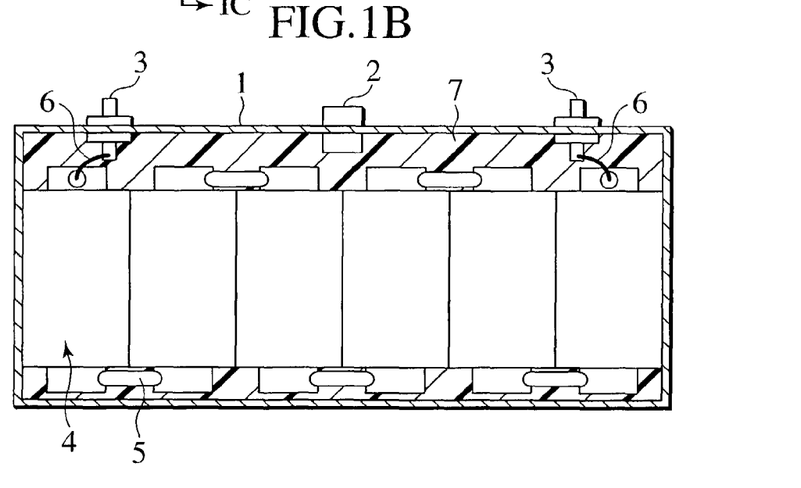
FIG. 1B is an end view of the assembled battery structure of embodiment 1.
Figure 1C:
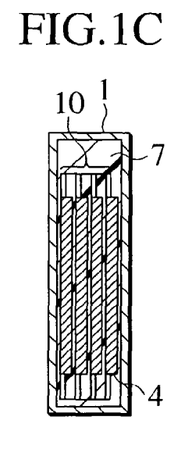
FIG. 1C is a sectional view of the assembled battery structure of embodiment 1 taken along a line IC-IC in FIG. 1A.

FIG. 1A is a top plan view showing an assembled battery of the embodiment 1, FIG. 1B is an end view showing the same, and FIG. 1C is a sectional view taken along a line IC-IC in FIG. 1A. A structure thereof will be explained below. The reference numeral 1 denotes a supporter, 2 a cell controller for controlling a charge/discharge state of each of unit cells 4, 3 external terminals, 4 the laminated unit cells, 5 bus bars for connecting the unit cells 4, 6 connection leads for connecting terminals of the unit cells and the external terminals, 7 resin filled between the cells 4 and the supporter 1.

Figure 2A:
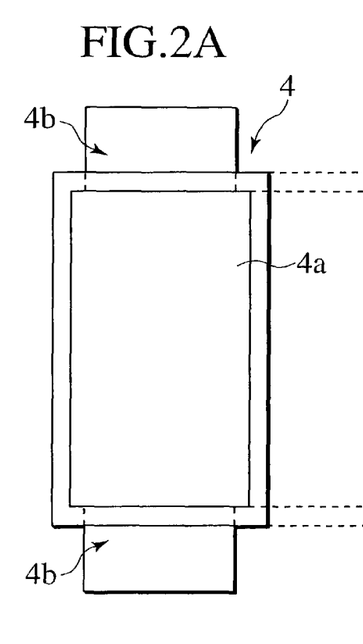
FIG. 2A is a top view of one of unit cells of embodiment 1.
Figure 2B:
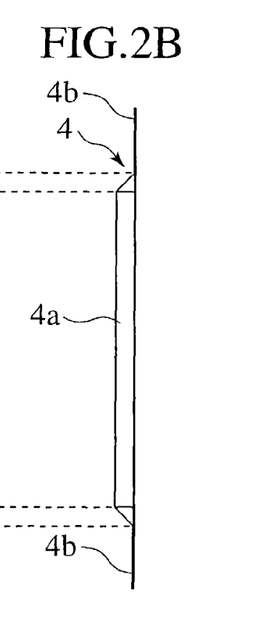
FIG. 2B is a side view of one of the unit cells of embodiment 1.
Figure 3A:
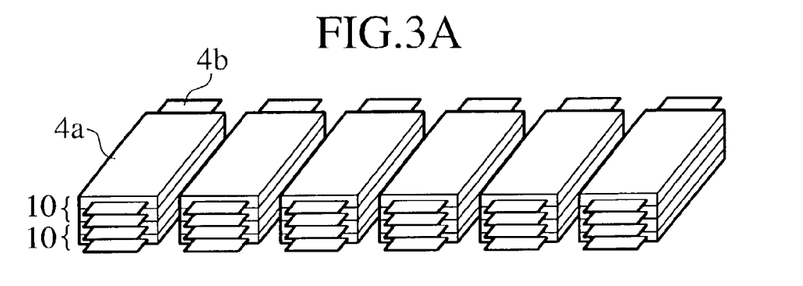
FIG. 3A is a schematic perspective view of the assembled battery structure of embodiment 1.
Figure 3B:
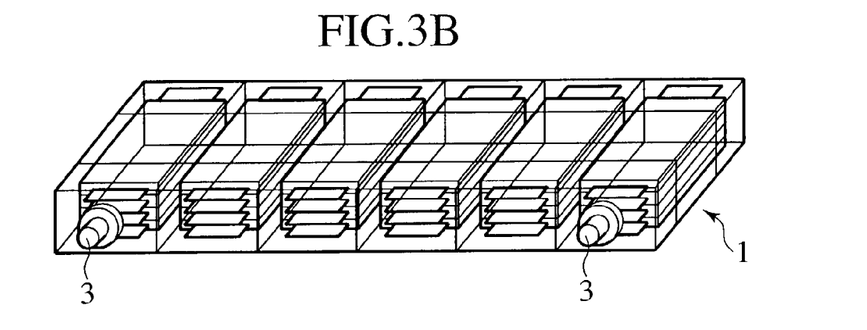
FIG. 3B is a schematic perspective view of the assembled battery structure of embodiment 1.

As shown in a top view of one of the unit cells 4 in FIG. 2A and a side view thereof in FIG. 2B, each of the unit cells incorporated in the assembled battery is composed of a sheet type cell member 4a packaged in laminate and tabs 4B provided on both sides of the cell member 4a to serve as a cathode and an anode. As shown in FIG. 3A and FIG. 3B, each of unit cell groups 10 are composed of the two unit cells 4 connected with each other in parallel, and the twelve unit cell groups 10 are connected in series by connecting the tabs 4b by the bus bars 5. The unit cells 4 are accommodated in the supporter 1 together with the resin 7 so as to be arranged in four columns of six rows. Spaces among the unit cells 4 are filled with the resin 7, and vibration applied from the outside of the battery is difficult to sufficiently transmit to each unit cell members 4a, tabs 4b, the bus bars 5, and the like. For each of the unit cells 4 as thin laminate cell, a lithium ion secondary cell employing lithium manganate as a cathode active material and carbon as an anode active material is desirable. Alternatively, it is desirable to employ a bipolar lithium ion secondary cell composed of a plurality of bipolar electrodes laminated in series with a solid polymer electrolyte sandwiched therebetween. Each of the bipolar electrodes include a collector having a cathode formed one surface and an anode formed on the other surface.

Here, a vibration-isolation structure of the assembled battery will be described below.

Figure 4A:
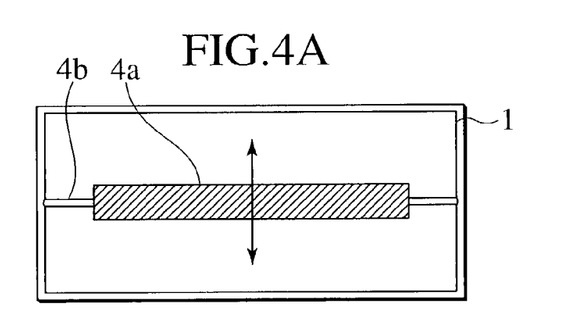
FIG. 4A is a model view in a case that one of the unit cells of embodiment 1 is supported on a supporter by tabs.
Figure 4B:
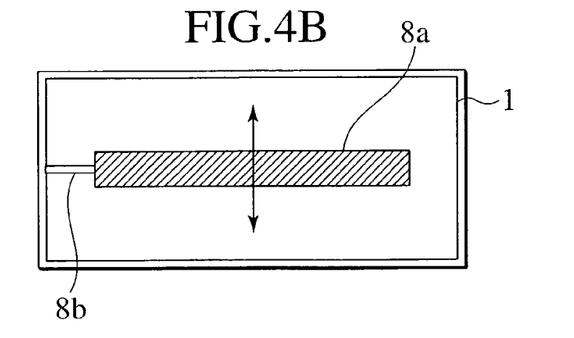
FIG. 4B is a model view in a case that one of unit cells of embodiment 2 is supported on the supporter by the tabs.
Figure 4C:
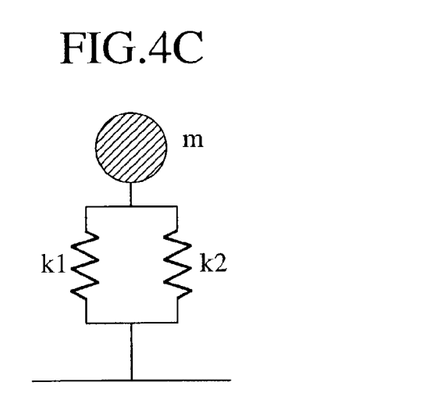
FIG. 4C is a view of a one-degree-of-freedom mass-spring model in a case where one of the unit cells is supported on the supporter by the tabs.

FIG. 4A and FIG. 4C show a one degree of freedom mass-spring model when one of the unit cells 4 used in the embodiment 1 is supported on the supporter 1 by the tabs 4b.

When a mass of the unit cell member 4a is set to be m, the mass-spring model is considered to be a model in which a spring constant k1 of the tabs 4b physically provided on the supporter 1 and a spring constant k2 of air within the supporter 1 are connected in parallel. Since the air spring is usually very small, for the vibration introduced to the supporter 1, the spring of the tabs 4b is vibrated by the mass m of the unit cell member 4a. By the amplitude thereof, stress is applied to the tabs 4b in each direction. Accordingly, there is a concern that the tabs 4b becomes structurally weakened, and the strength of a connecting portion is lowered.

Figure 5A:
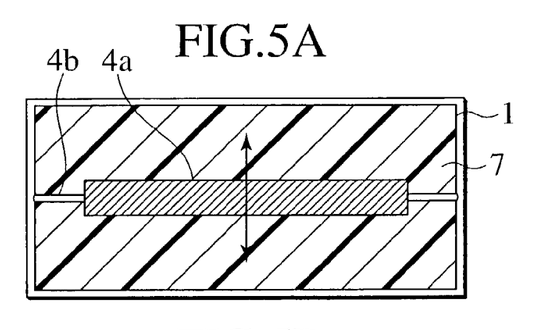
FIG. 5A is a model view in a case where one of the unit cells of embodiment 1 is supported on the supporter by the tabs and filled resin.
Figure 5B:
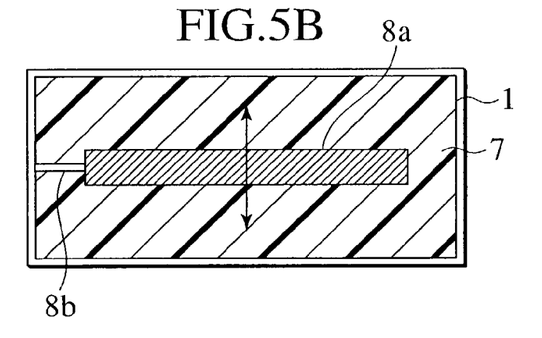
FIG. 5B is a model view in a case where one of the unit cells of embodiment 2 is supported on the supporter by the tabs and filled resin.
Figure 5C:
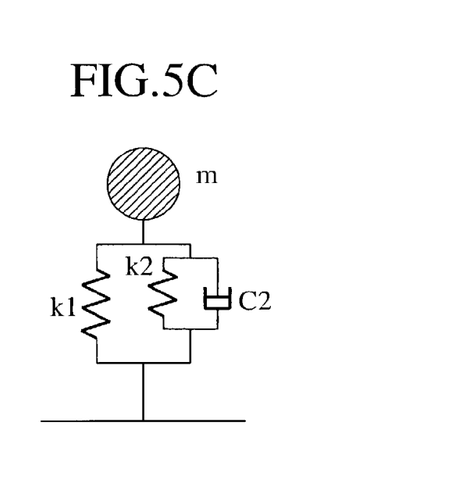
FIG. 5C is a view of a one-degree-of-freedom mass-spring model in a case where one of the unit cells is supported on the supporter by the tab and filled resin.

FIG. 5A and FIG. 5C show a one degree of freedom mass-spring model when one of the unit cells 4 used in the embodiment 1 is supported on the supporter 1 by the tabs 4b and the filled resin 7.

The air spring shown in FIG. 4A and FIG. 4B is substituted by a resin spring, and the absolute value of the spring constant of the resin 7 is close to that of the tabs 4b, so that a first resonance frequency of the mass-spring system is shifted to a higher frequency. When the introduced amplitude is the same, the amplitude of the unit cell member becomes small in inverse proportion to the increase of the spring constant, so that the absolute value of the displacement applied to the tabs 4b is decreased. Furthermore, resin damping converts vibration energy into heat energy, thus enabling efficient reduction of the vibration energy.

The assembled battery of embodiment 1 is controlled over thickness (mm) and surface density (kg/m$^2$) of each of the unit cells 4a, and thickness, surface density, and types of the resin group between the unit cells 4a. Therefore, in a vibration system of two or more degree of freedom using the unit cell 4a as a part by weight and the tabs 4b and the resin group as the spring portions, the first and second resonance frequencies can be arbitrarily set.

Figure 7:
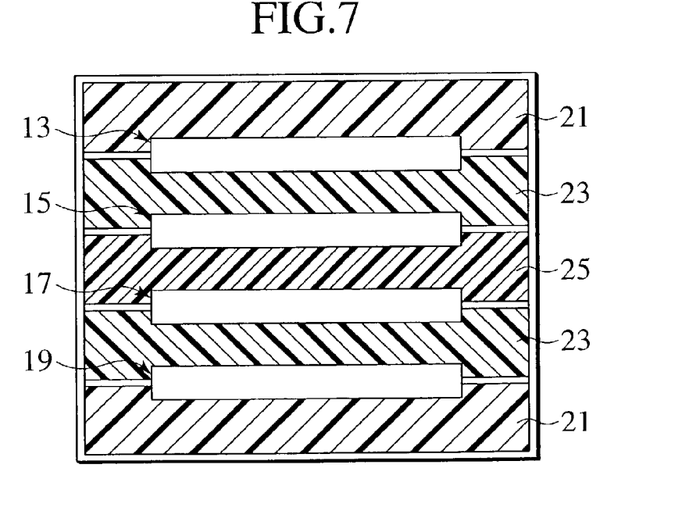
FIG. 7 is a model view of the assembled battery in a case where the four unit cells are covered with the group of two or more resin.

As shown in FIG. 7, the assembled battery of the embodiment 1 strictly forms a multidegree of freedom mass-spring system having four or more degree of freedom with the unit cells 4a as the part by weight and the tabs 4b and the resin group as the spring portion. The assembled battery having the two or more unit cells 4 forms a mass-spring system of a degree of freedom equal to the number of unit cells, thus damping the vibration energy.

Figure 6:
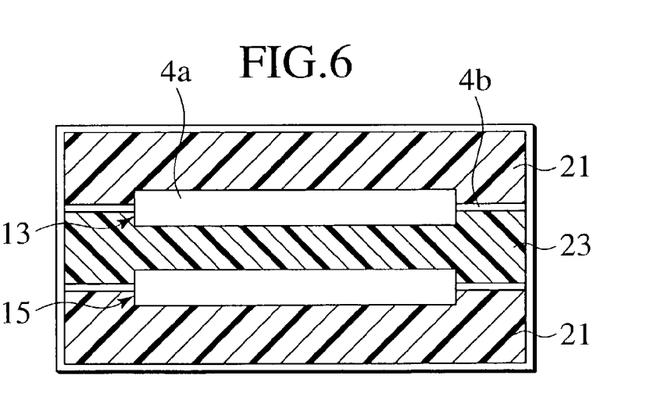
FIG. 6 is a model view of the assembled battery in a case where the two unit cells are covered with a group of two or more resin.

Here, characteristic angular frequencies ω1 and ω2 (resonance vibration frequencies) are calculated by use of the 2 degree of freedom mass-spring system shown in FIG. 6. The characteristic angular frequencies ω1 and ω2 are substantially determined from the following equations based on the parallel spring constants of the tabs 4b and the resin 21 and the resin 23 and the masses of the unit cells 4a.

$$\omega 1, \omega 2 = \frac{(a+b)}{2} \pm \sqrt{\left(\frac{a-b}{2}\right)^2 + bc} \quad (\omega 1 < \omega 2)$$

$$a = \frac{(k3+k4)}{m1}, b = \frac{k4}{m1}, c = \frac{k4}{m2}$$

$\omega 1$: first resonance frequency $\omega 2$: second resonance frequency $m1$: mass of unit cell 13

$m2$: mass of unit cell 15

$k3$: parallel spring constant between spring constant of resin 21 and spring constant of tab of unit cell 13

$k4$: parallel spring constant between spring constant of resin 23 and spring constant of tab of unit cell 15

Since the assembled battery of embodiment 1 is not a complete two degree of freedom or multidegree of freedom mass-spring system, the explanation can not be completely made by the above equations. However, the performance thereof can be tuned with reference to the above equations.

The object of the present invention is to exclude the resonance frequency of the assembled battery from a frequency range of the vibration frequency which occurs in the vehicle when the assembled battery is used for the vehicle. In the multidegree of freedom mass-spring system, the resonance frequencies cannot be deleted. However, it is possible that the resonance frequencies of the assembled battery are excluded from the range of frequency which can occur in the vehicle. Accordingly, the assembled battery never reaches the resonance frequencies as long as those used in the vehicle. Particularly, by changing the mass of each unit cell and the resin type, the first and second resonance frequencies can be arbitrarily set to 100 Hz or more in the multidegree-of-freedom mass-spring system.

In the case of the laminate unit cell 4 used in embodiment 1, the strength of the tabs 4b is particularly small, so that metal fatigue easily occurs in the tabs 4b due to the external vibration. Particularly, in a general constitution of the laminate unit cell, while the mass of each unit cell is about 100 g, each of the tabs 4b is a foil of aluminum, nickel, or the like, and thickness thereof is as thin as about 100 μm. Therefore, metal fatigue has easily occurred in the tabs 4b. However, in embodiment 1, by filling with the resin 7 thereinto, the vibration amplitude of the laminate cell member 4a is decreased, and thus stress applied to the tabs 4b is reduced.

Description will be made of the bus bars 5 connecting the plurality of unit cells 4. Since the masses of each tab 4b and each bus bar 5 are different from each other, the tab 4b and the bus bar 5 do not vibrate in the same phase. Accordingly, metal fatigue has easily occurred in the connection portion of each tab 4 and each bus bar 5 or the bottom portion of each tab 4b. However, in embodiment 1, since the supporter 1 is filled with the resin 7, the vibration amplitude of each bus bar 5 is decreased, thereby preventing the lowering of the strength of joining of each tab 4b and each bus bar 5.

Next, resin 7 will be explained.

With regard to a group of the resin 7 of embodiment 1, it is necessary that each of the unit cells 4 are covered with the group of the resin 7. However, even when a part of the space or the entire space other than the unit cells 4 within the supporter 1 is filled with the group of the resin 7, vibration energy can be efficiently reduced. For the reduction of the vibration, it is effective that the a group of the resin 7 is provided on a portion having a large amplitude such as the unit cells 4 and the bus bars 5, and the mass of the entire battery can be reduced. For the reduction of the vibration of the unit cells 4, the resin 7 can be provided on a peripheral portion of each unit cells 4. It is effective that only the bus bar 5 is covered with the resin 7 to reduce of the vibration of the bus bars 5.

The absolute value of the dynamic spring constant of the resin 7 is desirably smaller than that of the mass-spring system in which the unit cells 4 are connected to the supporter 1 via the tabs 4b. Specifically, the mass-spring system with the bus bars 5 connected to the supporter 1 via the tabs 4b as the spring and the unit cells 4 as the mass is considered. When the dynamic spring constant of the resin 7 covering the bus bars 5 is made close to the spring constant of the bus bars 5 or the like, not to the very small spring constant like the air spring, the stress applied to the bus bars 5 and the tabs 4b can be reduced. To the contrary, when the absolute value of the dynamic spring constant of the resin 7 is larger than that of the mass-spring system in which the unit cells 4 are supported on the supporter 1 via the tabs 4b, it increases the likelihood that stress is applied to the tabs 4b and the bus bars 5.

Generally, smaller transmissibility of vibration has a larger effect on the vibration isolation. Here, the transmissibility of vibration largely depends on the dynamic spring constant of the substance. For improving the vibration isolation performance, the spring constant needs to be decreased, but no particular limitation is given.

FIG. 6 and FIG. 7 are model views of the assembled battery in the case where a group of two or more resins are used. When a group of two or more resins (resin 21 and resin 23) are used as shown in FIG. 6, the absolute value of hardness of the resin 21 provided between an inner wall of the supporter 1 and the unit cells is desirably smaller than that of the resin 23 provided between the unit cells 4. Specifically, in order to reduce the introduction of the vibration, which is introduced into the supporter 1 from the outside into the unit cells 4 as much as possible, a group of the plurality of unit cells 4 is desirably isolated from the supporter 1 with regard to vibration. In the case that the absolute value of the hardness of the resin 21 is smaller than that of the resin 23, even when the supporter 1 vibrates, the unit cells 4 are aggregated into a group and the vibration from the outside is isolated, so that the vibration becomes hard to transmit to the unit cells 4.

As shown in FIG. 7, when three or more unit cells 4 are used, desirably, the absolute value of the hardness of the resin 25 positioned in the center is the largest, and the hardness of the resin is made smaller toward the supporter 1 in order of the resin 25, resin 23, and resin 21, but no particular limitation is given. The resin group other than the resin 21 between each cell unit 4 and the supporter 1 is unified to employ the same resin (the absolute value of hardness of the resin 25 equals that of the resin 23) having the absolute value of hardness larger than that of the resin 21, but no particular limitation is given.

Similarly to the hardness, with respect to dielectric loss tangent, the absolute value of the dielectric loss tangent of the resin 21 is desirably smaller than those of the resin 23, resin 25 and the like, which are provided between the unit cells 4, because the vibration isolation must be secured between the unit cells 4.

An effect can be obtained even when the above-described dielectric loss tangent is substituted by loss tangent, but no particular limitation is given.

The hardness JISA of the resin is desirably in a range of 5-95. When the hardness JISA is below 5, the resin is soft, so that the bus bars 5 connected to the unit cells 4, the tabs 4*b*, and the like are likely to sink in the resin by their own weight. When the hardness JISA exceeds 95, a vibration damping effect is reduced.

The dielectric loss tangent of the resin within a range of 10-1 kHz is desirably in a range of $1.0 \times 10^{-3}$-$5.0 \times 10^{-1}$. The vibration isolation frequency necessary for the assembled battery ranges 10-100 Hz. The resonance frequencies are unlikely to be in a frequency region below 10 Hz from the viewpoint of size of the assembled battery. Moreover, since the frequency exceeding 1 kHz is in a sound region, the necessity for vibration isolation is lower. The vibration reduction effect depends on the loss tangent, which can be obtained by a dynamic viscoelastic test. However, since it is difficult to perform an accurate measurement of a relatively soft resin in the test, the characteristics of the loss tangent can be expected by use of the dielectric loss tangent, whose correspondence with the vibration reduction effect is substantially equal to that of the loss tangent.

The dielectric loss tangent is desirably within a range of $1.0 \times 10^{-3}$-$5.0 \times 10^{-1}$ in a usual use temperature range of $-30$-$80°$ C. With the dielectric loss tangent below $1.0 \times 10^{-3}$, the resin is comparably soft, so that the unit cells are likely to sink due to its own weight by transmission of vibration. With the dielectric loss tangent exceeding $5.0 \times 10^{-1}$, the damping effect cannot be sufficiently obtained.

In the case that the loss tangent can be accurately measured, the loss tangent is also desirably within a range of $1.0 \times 10^{-3}$-$5.0 \times 10^{-1}$. The reason thereof is the same as in the case of the dielectric loss tangent.

A single resin or a combination of resins constituting the resin group is desirably selected from epoxy resin, urethane resin, nylon resin, and olefin resin. The resin group filled in the assembled battery has an object of protecting the unit cells 4 from the external environment as well as an object of reducing the transmission of vibration to the unit cells 4. For example, the resin group needs characteristics of water proof, moisture proof, thermal cycle resistance, heat resistance stability, insulation, flame retardant, and the like. For satisfying such criterion, the epoxy resin, the urethane resin, the nylon resin, and the olefin resin are desirable among the various resin groups.

Particularly, since the urethane resin is excellent in the above-described aspects, it is desirable to use the urethane resin as the resin of the present invention. The object of the present invention can be also achieved by using a resin such as silicon rubber and olefin elastomer in addition to the above-described resin, and a resin satisfying the above-described performances can be used as the resin group, and the resin group is not limited to the above described resin group. It is also effective to use a composite of the resin. The suitable resin is arranged in the various portions of sub modules, thereby achieving more effective vibration isolation.

The space other than the unit cells within the supporter is desirably occupied by the resin group within a range of 95-100 vol %. Since the resin group has objects such as the reduction of the transmissibility of vibration, and the enhancement of the waterproof property, moisture proof property, thermal cycle resistance, heat resistance stability, insulation, and flame retardant property, it is desirable that the resin basically exists in all the idle space in the supporter 1. Accordingly, occupation of less than 95 vol % is not preferable because the performances of the above-described function would be lowered. The assembled battery also needs a good heat radiation property, and air in the space would deteriorate the radiation property. Accordingly, occupation of 95 vol % or more is desirable from the viewpoint of the heat radiation property as much as possible.

Each of the unit cells 4 is desirably a thin laminated cell having a thickness in a direction of laminating electrodes within a range of 1-10 mm. The assembled battery is a means for efficiently assembling the unit cells 4 of small units into an assembled battery of large capacity and high voltage. The unit cells 4 efficiently covered with the resin group are laminated cells having an exterior composed of resin. Compared to the cell of the can explained in the conventional art, since an outer wall of each unit cell is made of a polymer film such as a nylon film, the dynamic spring constant of the unit cell 4 is small and vibration reduction efficiency is high. Because of the same resin environments, each unit cell 4 and the resin group are easily fitted to each other with regard to materials, so that detachment by vibration deterioration does not easily occur in the interface of each unit cells 4 and the resin group. From the viewpoint of the radiation property, the thickness of the laminated cell is desirably within a range of 1-10 mm.

From the above, each unit cell 4 is preferably a thin laminated cell having a thickness within a range of 1-10 mm., and in addition to the vibration reduction effect, each unit cell 4 has an effect of enhancing the performance of the heat radiation property or the like and reducing the various deteriorations.

Embodiment 2

Figure 8A:
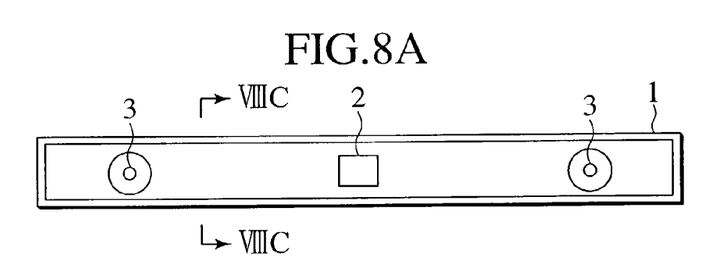
FIG. 8A is a top view of the assembled battery structure of embodiment 2.
Figure 8B:
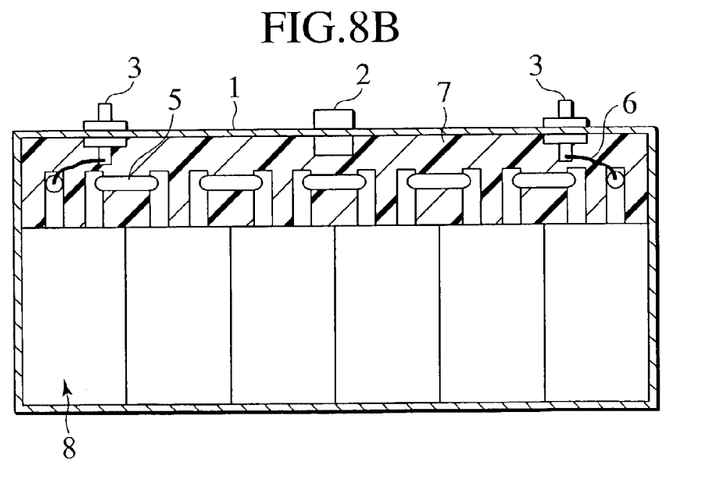
FIG. 8B is an end view of the assembled battery structure of embodiment 2.
Figure 8C:
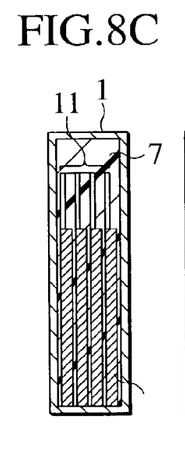
FIG. 8C is a sectional view of the assembled battery structure of embodiment 2 taken along a line VIIIC-VIIIC in FIG. 8A.
Figure 9A:
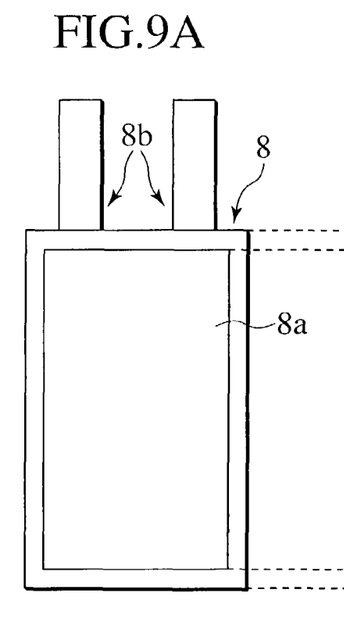
FIG. 9A is a top view of one of the unit cells of embodiment 2.
Figure 9B:
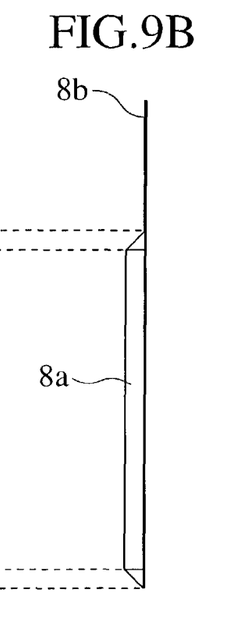
FIG. 9B is a side view of one of the unit cells of embodiment 2.
Figure 10A:
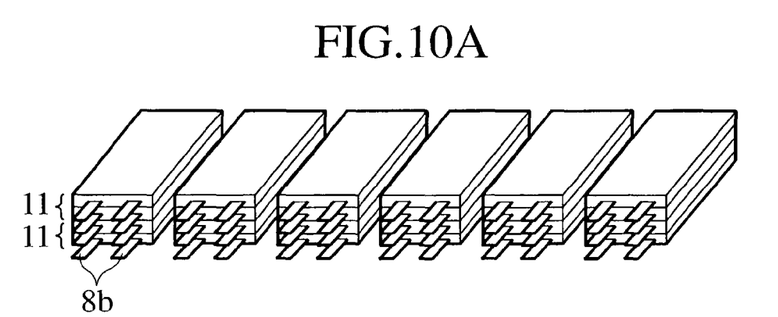
FIG. 10A is a schematic perspective view of the assembled battery structure of embodiment 2.
Figure 10B:
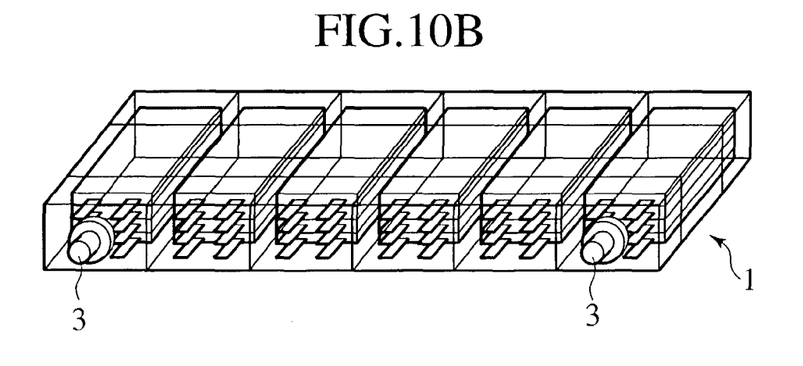
FIG. 10B is a schematic perspective view of the assembled battery structure of embodiment 2.

FIG. 8A is a top plan view showing an assembled battery of embodiment 2, FIG. 8B is a side view showing the same, and FIG. 8C is a sectional view taken along a line VIIIC-VIIIC of FIG. 8A. Since the basic constitution is similar to that of embodiment 1, only different portions will be described. The reference numeral 8 denotes laminated unit cells. As shown in FIG. 9A and FIG. 9B, each of the unit cells 8 is composed of a laminated sheet type cell member 8*a* and two tabs 8*b* provided on one side of the cell member 8*a* to serve as a cathode and an anode. As shown in schematic perspective views of the assembled battery in FIG. 10A and FIG. 10B, each of unit cell groups 11 is composed of the two unit cells 8 connected with each other in parallel, and the twelve unit cell groups 11 are connected in series by connecting the tabs 8*b* by the bus bars 5. The unit cells 8 are accommodated in the supporter 1 with the resin 7 so as to be arranged in four columns of six rows. Spaces among the unit cells 8 are filled with the resin 7, and on the application of vibration from outside of the assembled battery, vibration is not easily transmitted to the unit cells 8, the tabs 8*b*, the bus bars 5, and the like. FIG. 4B and FIG. 5B show mass-spring models in embodiment 2. The vibration isolation structure of embodiment 2 is the same as that explained in the embodiment 1, and the description thereof will be omitted.

EXAMPLES

Figure 13:
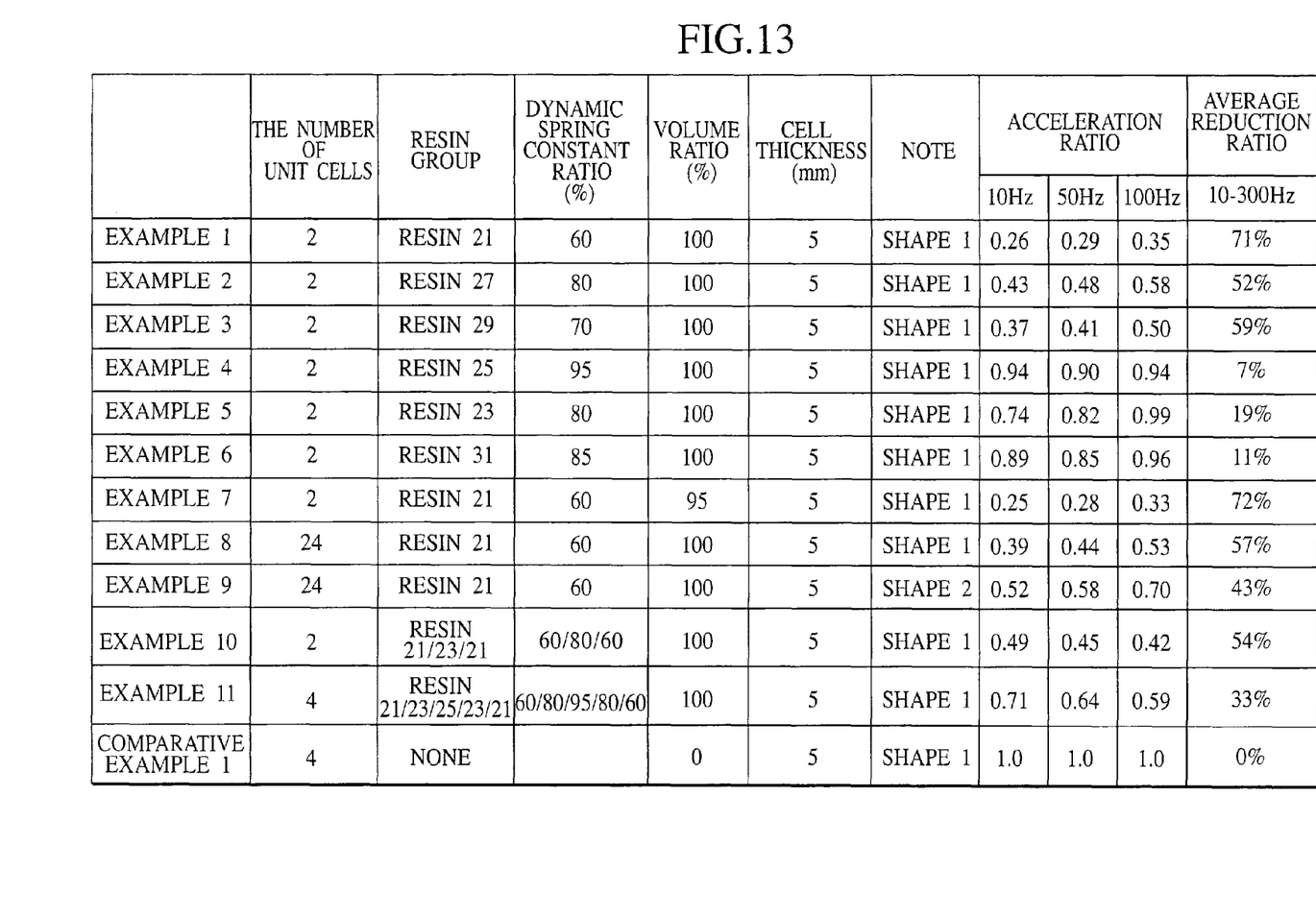
FIG. 13 is test results of embodiments of the present invention.
Figure 14:
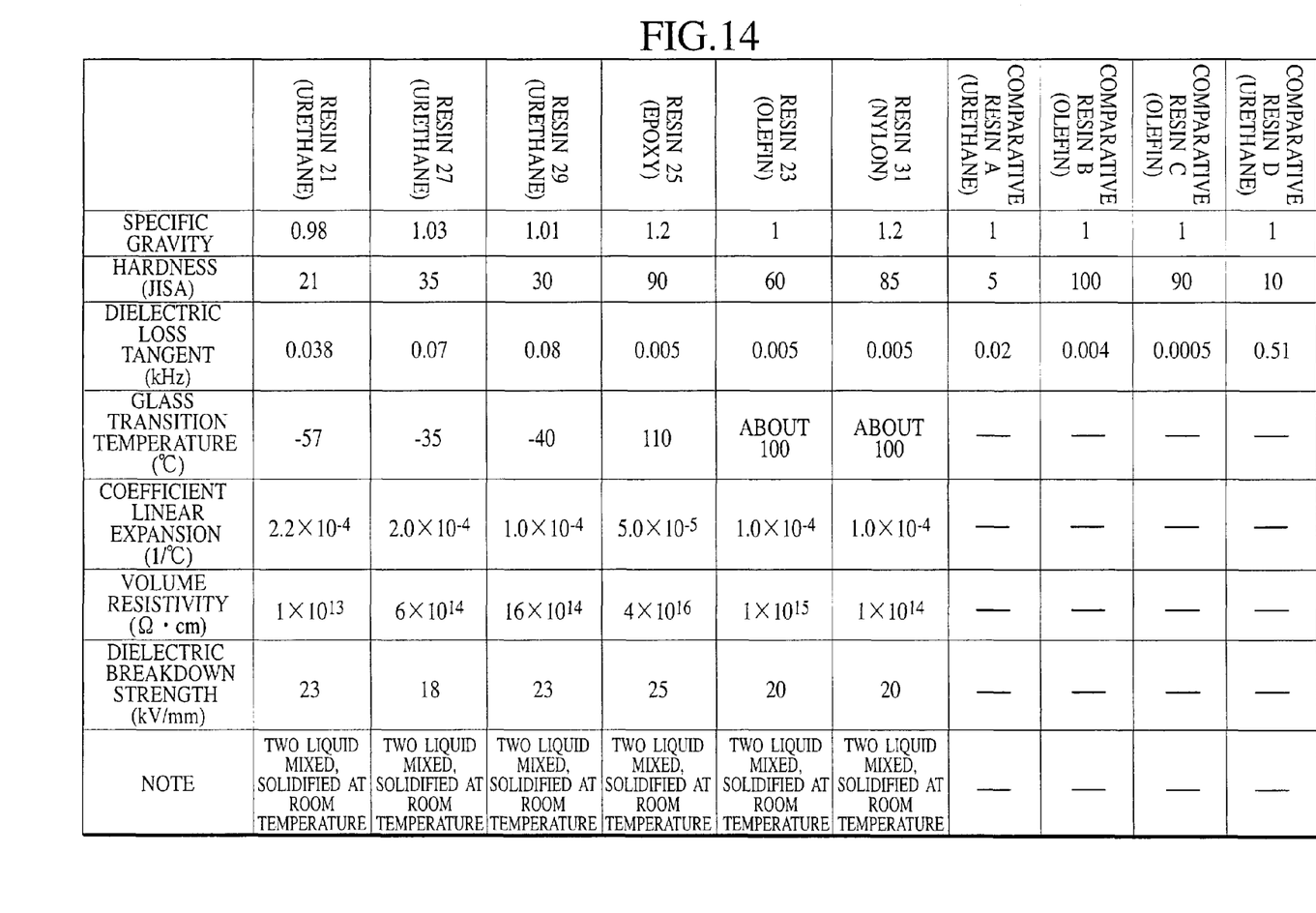
FIG. 14 is specific values of the resin used in the examples.

Hereinafter, description will be made in detail based on examples of the present invention, but the present invention is not limited to the examples. Specifications and evaluation results of the examples are shown in FIG. 13, and specifications of resin used are shown in FIG. 14.

Example 1

Figure 11A:
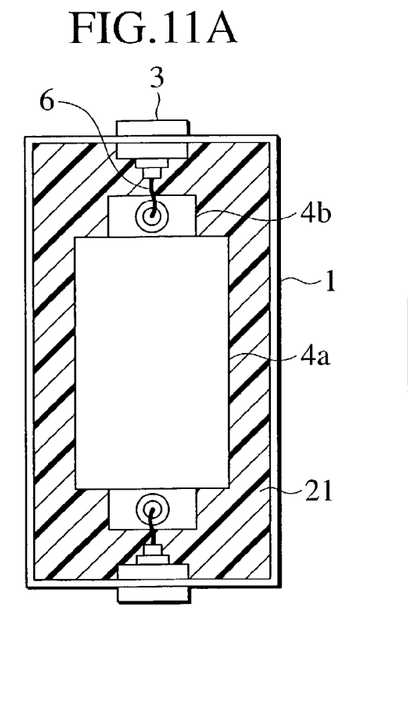
FIG. 11A is a top view of the assembled battery structure of examples 1 to 7.
Figure 11B:
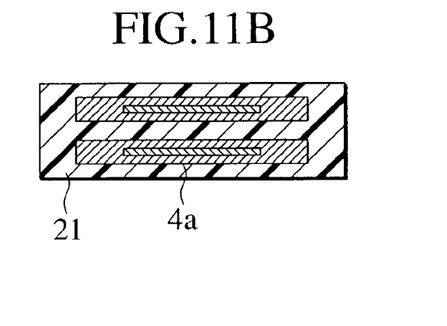
FIG. 11B is a side view of the assembled battery structure of examples 1 to 7.

FIG. 11A is a view showing an assembled battery of example 1. The two laminated unit cells shown in FIG. 2A (referred to as shape 1 in FIG. 13) were provided in parallel in the metallic supporter, and the resin 21 was poured into the supporter to be solidified at room temperature. At this time, the unit cells were provided with proper spaces in thickness and tab directions. The resin was poured into all the spaces, and thus the assembled battery was manufactured. The specification of the resin 21 is shown in FIG. 14. In the mass-spring system, the mass of the unit cell 4 of the assembled battery was used as the mass, and in the thickness direction of the resin 21, the ratio of the dynamic spring constant of the tab to that of the resin 21 was set at 60%. Here, the unit cell employs the lithium ion secondary cell having lithium manganate used as the cathode active material and carbon used as the anode active material, but is not limited to this.

Example 2

The assembled battery was manufactured in the same manner as example 1 except that the poured resin was resin 27 and the dynamic spring constant ratio was set at 80%.

Example 3

The assembled battery was manufactured in the same manner as example 1 except that the poured resin was resin 29 and the dynamic spring constant ratio was set at 70%.

Example 4

The assembled battery was manufactured in the same manner as example 1 except that the poured resin was resin 25 and the dynamic spring constant ratio was set at 95%.

Example 5

The assembled battery was manufactured in the same manner as example 1 except that the poured resin was resin 23 and the dynamic spring constant ratio was set at 80%.

Example 6

The assembled battery was manufactured in the same manner as example 1 except that the poured resin was resin 31 and the dynamic spring constant ratio was set at 85%.

Example 7

The assembled battery was manufactured in the same manner as example 1 except that the resin 21 was injected into 95% of the spaces between the supporter and the unit cell.

Example 8

In the constitution of the assembled battery of embodiment 1 shown in FIG. 1A, FIG. 1B, and FIG. 1C, the resin 21 was poured into all the spaces thereof, thus manufacturing the assembled battery. In the mass-spring system, the mass of the unit cell 4 of the assembled battery was used as the mass, and in the thickness direction of the resin 21, the ratio of the dynamic spring constant of the tab portion to that of the resin 21 was set at 60% on average for the unit cells.

Example 9

Figure 12A:
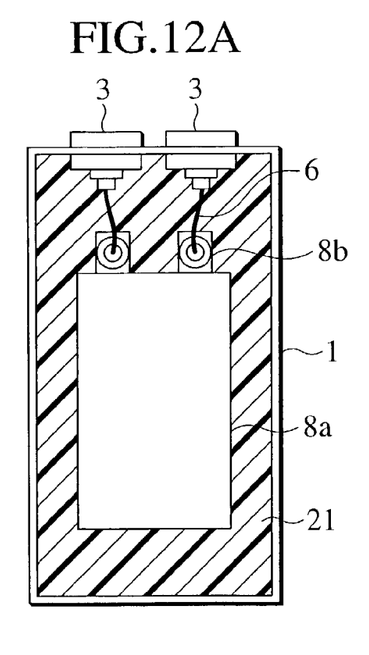
FIG. 12A is a top view of the assembled battery structure of example 9.
Figure 12B:
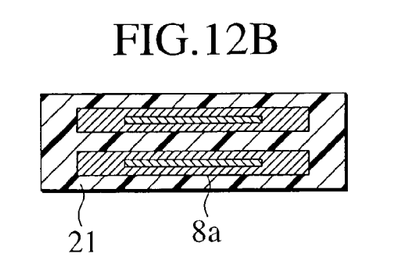
FIG. 12B is a side view of the assembled battery structure of example 9.

In the constitution of the assembled battery of the embodiment 2 shown in FIG. 8A, FIG. 8B, and FIG. 8C, the two laminated unit cells 8 shown in FIG. 9A (referred to as shape 2 in the FIG. 14) were provided in parallel, and the resin 21 was poured into all the spaces thereof, thus manufacturing the assembled battery. Except that, the assembled battery was manufactured in the same manner as example 8. FIG. 12A and FIG. 12B are schematic views showing a structure of example 9.

Example 10

In the assembled battery shown in FIG. 6, the two laminated unit cells 4 shown in FIG. 2A (referred to as shape 1 in the FIG. 13) were provided in parallel on the metallic supporter. The resin 21 was poured into the space between the supporter and the unit cell 15 to be solidified. The resin 23 was then poured into the space between the unit cell 13 and the unit cell 15 to be solidified. Subsequently, the resin 21 was poured into the space between the upper portion of the supporter and the unit cell 13 to be solidified at room temperature. At this time, the unit cells were provided with proper spaces in the thickness and tab directions. The resin 21 and the resin 23 were poured into all the spaces thereof, thus manufacturing the assembled battery. The specifications of the resin 21 and the resin 23 are shown in FIG. 14. In the mass-spring system, the mass of the unit cell 4 of the assembled battery was used as the mass, and in the thickness direction of the resin 21, the ratios of the dynamic spring constant of the tab portion to those of the resin 21 and the resin 23 were set at 60% and 80%, respectively.

Example 11

In the assembled battery shown in FIG. 7, the two laminated unit cells 4 shown in FIG. 2A (referred to as shape 1 in the FIG. 13) were provided in parallel on the metallic supporter. The resin 21 was poured into the space between the supporter and the unit cell 19 to be solidified. The resin 23 was then poured into the space between the unit cell 17 and the unit cell 19 to be solidified. Subsequently, the resin 25 was poured into the space between the unit cell 15 and the unit cell 17 to be solidified. After the resin 23 was poured into the space between the unit cell 13 and the unit cell 15 to be solidified, the resin 21 was poured into the space between the upper portion of the supporter and the unit cell 13 to be solidified at room temperature. At this time, the unit cells were provided with proper spaces in the thickness and tab directions. The resin 21, the resin 23, and the resin 25 were poured into all the spaces thereof, thus manufacturing the assembled battery. The specifications of the resin 21, the resin 23, and the resin 25 are shown in FIG. 14. In the mass-spring system, the mass of the unit cell 4 of the assembled battery was used as the mass, and in the thickness direction of the resin 21, the ratios of the dynamic spring constant of the tab portion to those of the resin 21, the resin 23, and the resin 25 were set at 60%, 80%, and 95%, respectively.

Comparative Example 1

The assembled battery similar to example 1 was manufactured without pouring the resin into the supporter.

Test Example

The following experiments were carried out for the batteries obtained in the above-described examples 1 to 11, and the comparative example 1.
(Measurement of Dynamic Spring Constant)

An acceleration pickup was installed in the center of the unit cell surface of the upper portion of the assembled battery obtained by each method of the examples 1 to 11 and the comparative example (the resin in a space for the pickup was secured, and the resin coating was removed). The assembled battery was forcibly vibrated, and a curve obtained by the acceleration pick up was subjected to a convergence calculation by the curve fitting method, thus calculating a value of the dynamic spring constant. Here, the dynamic spring constant ratio is a ratio on the basis of the value obtained by applying vibration to the assembled battery without the resin.

(Measurement of Acceleration Ratio)

The acceleration pickup was installed in a position set by the measurement of the dynamic spring constant. The assembled battery was forcibly vibrated at 10 Hz, 50 Hz, and 100 Hz. A ratio of the acceleration value obtained by the pickup was calculated on the basis of the acceleration value obtained under the same conditions in the case without the resin. Accordingly, the acceleration ratio of 1.0 means that the absolute value of the acceleration in the case with the resin is equal to that in the case without the resin. The acceleration ratio of more than 0.0 and less than 1.0 means that the vibration is reduced. The acceleration ratio exceeding 1.0 means that acceleration is raised by antiresonance, and the vibration is strengthened.

(Measurement of Average Reduction Ratio)

The acceleration is measured at 10 Hz to 300 Hz. The average reduction ratio is an average of the reduction amount, and the larger thereof means that the vibration is reduced more.

(Measurement of Hardness JISA)

Measurement is carried out based on a hardness JISA measurement method of Japanese Industrial Standards JIS K6253 and the International Standards Organization ISO 48.

(Measurement of Dielectric Loss Tangent)

Measurement is carried out based on a measurement method of a dielectric loss tangent based of Japanese Industrial Standards JIS K6911 and the International Electrotechnical Commission IEC 60250.

These test results are shown in FIG. 13, and the specific values of the resin used in the examples are shown in FIG. 14.

The entire content of a Japanese Patent Application No. P2001-281217 with a filing date of Sep. 17, 2001 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An assembled battery, comprising:
a supporter;
a plurality of unit cells provided within the supporter, the unit cells being thin layer laminated cells having a cell member and tabs;
one or more resins covering the unit cells,
wherein the plurality of unit cells are stacked to form one or more laminate structures, and the one or more resins are poured between the cell members and between the unit cells and inner walls of the supporter,
wherein the tabs are embedded in the one or more resins, and
wherein a dielectric loss tangent of each of the one or more resins within a range of 10 to 1 kHz ranges from $1.0 \times 10^{-3}$ to within a temperature range of $-30$ to $80°$ C.

2. An assembled battery according to claim 1,
wherein the supporter is filled with a plurality of resins, and an absolute value of hardness of each of the one or more resins provided between an inner wall of the supporter and each of the unit cells is smaller than that of the one or more resins provided between the unit cells.

3. An assembled battery according to claim 1,
wherein a hardness JISA of each of the resins is within a range of 5-95 according to JIS K6253.

4. An assembled battery according to claim 1,
wherein the one or more resins are selected from the group consisting of epoxy resin, urethane resin, nylon resin, olefin resin, and combinations thereof.

5. An assembled battery according to claim 1,
wherein each of the unit cells is a lithium ion secondary cell using lithium manganate as a cathode active material and carbon as an anode active material.

6. An assembled battery according to claim 1,
wherein each of the unit cells is a bipolar lithium ion secondary cell having a plurality of bipolar electrodes laminated in series with a solid polymer electrolyte sandwiched therebetween, each of the bipolar electrodes includes a cathode formed on one surface of a collector and an anode formed on the other surface thereof.

7. An assembled battery according to claim 1,
wherein the supporter comprises an external terminal, and the external terminal is connected to one of the tabs of the unit cells by a connection lead, and
the connection lead is embedded in the one or more resins.

8. An assembled battery according to claim 7,
wherein a part of the external terminal is embedded in the one or more resins.

* * * * *